US012791749B2

(12) United States Patent
Andreasen et al.

(10) Patent No.: US 12,791,749 B2
(45) Date of Patent: Nov. 10, 2026

(54) AIRBORNE STRUCTURE FOR AN ARRAY OF GEOPHYSICAL SENSORS, TO BE TOWED BY AN AIRCRAFT, AND KIT AND METHOD FOR ASSEMBLING THE SAME

(71) Applicant: UMag Solutions ApS, Birkerød (DK)

(72) Inventors: Arne Dossing Andreasen, Vaerlose (DK); Eduardo L.S. Silva, Copenhagen (DK); Mick Emil Kolster, Naerum (DK)

(73) Assignee: UMAG SOLUTIONS APS, Birkerød (DK)

(*) Notice: Subject to any disclaimer, the term of this patent is extended or adjusted under 35 U.S.C. 154(b) by 581 days.

(21) Appl. No.: 18/037,276

(22) PCT Filed: Nov. 17, 2020

(86) PCT No.: PCT/EP2020/082438
§ 371 (c)(1),
(2) Date: May 16, 2023

(87) PCT Pub. No.: WO2022/105990
PCT Pub. Date: May 27, 2022

(65) Prior Publication Data
US 2023/0393298 A1 Dec. 7, 2023

(51) Int. Cl.
*G01V 3/16* (2006.01)

(52) U.S. Cl.
CPC .................................... *G01V 3/16* (2013.01)

(58) Field of Classification Search
None
See application file for complete search history.

(56) References Cited

U.S. PATENT DOCUMENTS 6,244,534 B1 * 6/2001 Klinkert ................. G01V 3/165 324/330
6,845,936 B1 * 1/2005 Mouge ................... G01V 3/165 324/331

(Continued)

FOREIGN PATENT DOCUMENTS

CN 108680961 B 7/2020
DE 202020001116 U1 3/2020

OTHER PUBLICATIONS

International Search Report for International Application No. PCT/EP2020/082438 mailed Jul. 19, 2021, 6 pages.

(Continued)

*Primary Examiner* — Stephanie E Bloss
*Assistant Examiner* — Diana Hancock
(74) *Attorney, Agent, or Firm* — Edell, Shapiro & Finnan, LLC

(57) ABSTRACT

Disclosed is an airborne unitary structure, to a kit and to a method for assembling and scaling such an airborne unitary structure. The unitary structure is configured to be towed by an aircraft such as an Unmanned Aerial Vehicle. The kit comprises at least two sensor modules and a linkage assembly. The two sensor modules are each configured to house at least one geophysical sensor. The linkage assembly is configured to rigidly connect the at least two sensor modules with one another and spaced apart from one another and thus securing their exact position relative to one another to allow exact relative measurements. To adapt the structure to different measurement tasks, the linkage assembly is configured to be assembled in a first configuration and in a second configuration, wherein the first configuration differs from the second configuration in at least one of a distance between the at least two sensor modules and the number of sensor modules in the array. The structure may be particularly used for gradient measurements, such as using magnetometers as (Continued)

geophysical sensors. In a particularly advantageous embodiment, the sensor modules and/or the linkage assembly themselves are of modular structure.

18 Claims, 6 Drawing Sheets

(56) References Cited

U.S. PATENT DOCUMENTS

| | | | | |
|---|---|---|---|---|
| 9,205,922 | B1 * | 12/2015 | Bouwer | B64D 9/00 |
| 11,500,120 | B2 * | 11/2022 | Døssing | B64D 3/00 |
| 2013/0062464 | A1 * | 3/2013 | Speer | B64D 3/02 244/1 TD |
| 2015/0048834 | A1 * | 2/2015 | Allen | G01V 3/081 324/336 |
| 2016/0061984 | A1 * | 3/2016 | Partner | G05D 1/0088 324/330 |

OTHER PUBLICATIONS

Office Action from the Canadian Intellectual Property Office for Canadian Patent Application No. 3,199,950 dated Sep. 4, 2024, 4 pages.
Communication pursuant to Article 94(3) from the European Patent Office for European Patent Application No. 20808376.6 dated Apr. 17, 2026, 8 pages.

* cited by examiner

AIRBORNE STRUCTURE FOR AN ARRAY OF GEOPHYSICAL SENSORS, TO BE TOWED BY AN AIRCRAFT, AND KIT AND METHOD FOR ASSEMBLING THE SAME

The invention is concerned with an airborne unitary structure for an array of geophysical sensors, the unitary structure being configured to be towed by an aircraft, as well as with a kit and a method for assembling such a unitary structure and/or a sensor module that is configured to be towed by an aircraft.

Arrays of geophysical sensors that are towed by an aircraft are used for scanning the surface and subsurface of a region. For example, geophysical sensors that are responsive to magnetic fields may be used to perform magnetic mapping of the earth's subsurface. Other applications may use different sensors that are sensible towards other physical parameters, such as microwave radiation, gas, light, or gravity. Subsurface scans may be used to detect hidden underground structures. Further, particularly using magnetic mapping, unexploded ordnances, such as landmines, metallic pollution, as well as ore mineral bodies may be detected.

For towing the array of geophysical sensors, various types of aircrafts, such as airplanes, helicopters or unmanned aerial vehicles may be used. Typically, the geophysical sensors are towed 30 to 50 meters below the aircraft, such as a helicopter or an airplane, in order to reduce the influence of magnetic or electric noise of the aircraft on the geophysical measurements. With unmanned aerial vehicles, the length of the tow may be reduced to a few meters.

Examples of a towed array of geophysical sensors are described in e.g. U.S. Pat. No. 3,418,568, US 2005/0017721 A1, U.S. Pat. No. 10,241,224 B2, and WO 2018/028956 A1.

The particular geometric configuration of the array depends on the type of sensors used and on the type of structures expected to be detected in the subsurface. The quality and accuracy of the measurement depends on the sensors used and further on how well the geometry of the array is maintained over the duration of the measurement, i.e. during towing.

Thus, there is a need for an array of geophysical sensors that can be adapted to different applications using different sensors and/or different geometric configurations for detection, and at the same time ensures a high measurement quality.

This need is met by a kit for assembling an airborne unitary structure of an array of geophysical sensors, the unitary structure being configured to be towed by an aircraft, the kit comprising: at least two sensor modules, each sensor module of the at least two sensor modules being configured to house at least one of the geophysical sensors; and a linkage assembly, the linkage assembly configured to rigidly connect the at least two sensor modules with one another and spaced apart from one another; wherein the linkage assembly is configured to be assembled in a first configuration and in a second configuration, wherein the first configuration differs from the second configuration in at least one of a distance between the at least two sensor modules and the number of sensor modules in the array.

The need is further met by an airborne unitary structure made from such a kit and/or by an airborne unitary structure being configured to be towed by an aircraft, the structure comprising: at least two sensor modules, each sensor module of the at least two sensor modules being configured to house at least one of the geophysical sensors; and a linkage assembly, the linkage assembly being configured to be assembled in a first configuration and in a second configuration, wherein the first configuration differs from the second configuration in at least one of a distance between the at least two sensor modules and the number of sensor modules in the array.

Finally, the need is also met by a method for assembling an airborne unitary structure for an array of geophysical sensors, the method comprising the steps of: providing at least two sensor modules, each sensor module being configured to house at least one geophysical sensor; providing a linkage assembly; assembling the linkage assembly in one of at least two different configurations, the two configurations differing from one another in at least one of the number of sensor modules connected by the linkage assembly and the distances between the at least two sensor assemblies; and connecting the at least two sensor modules with one another using the linkage assembly.

Using the above kit, the problem is also solved by a kit for assembling an airborne sensor module, the sensor module being configured to be towed by an aircraft, the kit comprising: at least one tip module configured to house electric or electronic components, at least one fuselage module, a plurality of fins and at least one geosensor module configured to house a geophysical sensor, wherein the at least one tip module, the at least one fuselage module, the plurality of fins and the at least one geosensor module are configured to be repeatedly assembled and disassembled; and by an airborne unitary structure for an array of geophysical sensors, the structure being configured to be towed by an aircraft and comprising at least two sensor modules that house a geophysical sensor, and comprising a modular linkage assembly, the modular linkage assembly rigidly connecting the at least two sensor modules and forming a truss.

By providing a unitary structure with a linkage assembly that rigidly connects the at least two sensor modules at one or more, e.g. at least two, selectively different distances with one another, the unitary structure may be used for different applications by adjusting the distance. At the same time, the quality of the measurement is ensured by the rigid connection between the sensor modules. The rigid connection keeps the distance constant while the structure is being towed. Thus, the sensor modules maintain their exact position relative to one another during the measurement. This is important if e.g. gradient measurements are made or when the quality of the measurement depends on exact knowledge of the distances between the geophysical sensors. The modular structure allows not only to adjust the distance between the geophysical sensors to the application at hand, but, independently thereto, to scale the unitary structure according to needs, by adding or taking away any number of sensor modules.

The above kit, structure and method may be further improved by one or more of the features that are explained in the following. The following features are advantageous independently of one another and may be arbitrarily combined. Any feature may be used equally for the unitary structure, and the kit and the method for assembling the structure.

For example, according to one embodiment, the kit and the structure may comprise one or more tow anchors. The tow anchor may be configured to be mounted to at least one of the linkage assembly and at least one of the two sensor modules. The tow anchor is preferably configured to be attached to one of a tow line arrangement and a two rod arrangement. Thus, using the tow anchor, the structure may be connected to the aircraft. The tow anchor is preferably a module of the kit and may be equally mounted to a sensor module or a linkage assembly without any modification to the tow anchor and/or the respective other part. This ensures that the towing forces are applied to the structure at a position of the structure, where aerodynamic stability is maintained.

The at least two sensor modules may be spaced apart from one another in a direction perpendicular to a flight direction and/or along the flight direction. The specific three-dimensional positioning of the sensor modules within the unitary structure depends on the required location of the geophysical sensors in view of the measurement task.

A sensor module may comprise a tip section, a fuselage section, an empennage section and/or a tail section. Each of these section constitutes a module of the kit.

Each section may be itself of modular configuration to allow any combination of these sections to assemble a sensor module. The kit may comprise different variants of each section, i.e. different modules, each variant being configured to be exchangeable with another variant. This is explained further below.

Preferably, a sensor module is torpedo or missile-shaped. More specifically, a sensor module may have an elongated configuration, the elongation is directed along the flight direction A length of the sensor module may be between 1 and 3 m.

In the structure, the sensor modules may be arranged parallel to one another. The longitudinal axes of the sensor modules are preferably parallel to the flow or flight direction. Any deviations within a stable flight regime from a strict alignment in parallel to the flight direction are still considered to be parallel.

The fuselage section of a sensor module may be an elongated cylinder, e.g. be formed by a tube or rod. The fuselage section may include a tip, which in orientation faces in the direction of flight. The shape of such a tip may be a bulb or a droplet. The diameter of the fuselage section may be between 2 and 20 cm, preferably below 5 cm.

According to a further advantageous embodiment, the linkage assembly may be collapsible.

A collapsible linkage assembly may comprise at least one collapsible rod assembly. A collapsible rod assembly may comprise a plurality of linkage rods that are configured to be movable from the first to the second configuration, e.g. by translation and/or rotation relative to one another. The rod assembly may comprise one or more joints that are configured to connect at least two linkage rods and/or one or more linkage rods and a sensor module. The joints may be configured to allow a rotational and/or translational motion of the linkage rods relative to one another and/or relative to the sensor module.

The collapsibility allows for arranging the at least two sensor modules at the first and second distance from one another. A collapsible rod assembly may, however, not only be used for providing two different measurement distances. The first distance may be also used for maintaining an operational configuration, which is used for measurement purposes. The second distance may be used for transport, for example in that the rod assembly is collapsed and therefore the distance between the at least two sensor modules is minimized. This allows storing the structure in e.g. transport boxes A collapsible rod assembly may carry one or more sensor modules and may be fixed to another sensor module which serves as a carrier or a central sensor module. For example, the collapsible rod assembly may be configured like the mechanics of an umbrella. The rod assembly may comprise a slider which is configured along the carrier sensor module and a linkage rod, which is connected to the slider at one end and with a pivoting rod or another sensor module with the other end. The pivoting rod may be pivotably fixed to the carrier or central sensor module. Each such rod assembly may carry a different sensor module.

The collapsible linkage assembly may be telescoping in addition or as an alternative to a pivoting linkage assembly, e.g. by comprising at least one telescoping rod assembly. A telescoping rod assembly also allows rigidly connecting two sensor modules with one another in a rigid manner.

The linkage assembly may be configured to carry any number of sensor modules, such as two, three, four, five, six or more sensor modules.

The linkage assembly that rigidly connects the at least two sensor modules of the unitary structure is preferably configured to allow repeated connection and disconnection of the at least two sensor modules from one another. The disconnection may be used for transport, for example in that the unitary structure is disconnected and therefore the distance between the at least two sensor modules is minimized. This allows storing the structure in e.g. transport boxes.

In one embodiment, the linkage assembly may comprise a central sensor module and one or more secondary sensor modules. The central module may comprise or be configured to house communication electronics that is configured for communication with an external communication device. The external communication device may be on the ground or located e.g. in the towing or another aircraft. The communication electronics may be configured to communicate data wirelessly or wire-bound, using digital or analog communication. For example, the communication electronics may be connected to WLAN or use the Bluetooth standard.

The central sensor module may comprise at least one geophysical sensor. The secondary sensor modules may not have a communication electronics but only at least one geophysical sensor that is connected for data transfer with the central sensor module, e.g. the at least one geophysical sensor of the central sensor module and the communication electronics of the central sensor module. The central sensor module may also comprise a geolocation sensor, such as an inertial measurement unit, a compass or a sensor configured to receive and process signals from a global navigation satellite system such as GNSS, GPS, Glonass and/or Galileo. Such a geolocation sensor may be part of the kit. A secondary sensor module does not need to have a geolocation sensor if such a sensor is comprised in the central sensor module, especially in the tip and/or the fuselage module.

The kit may further comprise an energy source, such as a battery, that may be configured to be included in any of the at least two sensor modules. Preferably, the entire structure comprises only a single energy source which is located in the central sensor module. The central sensor module, in particular the tip module and/or the fuselage module may be configured to house the energy source for the structure.

The kit may further comprise a datalogging unit that is configured for logging data and that may be configured to be included in any of the at least two sensor modules. Preferably, the entire structure comprises a single datalogging unit. The central sensor module, especially the tip module and/or the fuselage module, may be configured to house the datalogging unit.

The kit may further comprise an altimeter, such as a radar and/or laser altimeter. The central sensor module, especially the tip module and/or the fuselage module may be configured to house the altimeter. The structure may comprise only one altimeter, which then preferably is located in the central sensor module.

The kit may further comprise a acceleration and/or position sensor, which is configured to measure the orientation of the structure with respect to gravity, e.g. to measure changes in yaw, roll and/or pitch of the structure. The central sensor module, especially the tip module and/or the fuselage module may be configured to house the acceleration and/or position sensor. The structure may comprise only one acceleration and/or position sensor, which then preferably is located in the central sensor module.

The kit may further comprise signal lines and/or energy supply lines that are configured to connect the at least two sensor modules with one another. For example, the energy supply lines may be used to connect secondary sensor modules to an energy source, which is located in the central sensor module. Having a central energy source in the central sensor module simplifies maintenance, as only a single device needs to be accessed for battery replacement and/or charging.

The linkage assembly may be configured to receive at least one signal line and/or energy supply line. The signal lines and/or energy supply lines may be routed through the linkage assembly, e.g. through at least one linkage rod extending from one sensor module to another. For this, the linkage rod may be hollow. Alternatively, a linkage rod may already be provided with a signal and/or energy supply line and preferably also comprise electric connectors at its ends that are configured to be electrically connected to complementary connectors in the at least sensor modules.

The linkage assembly in particular the collapsible linkage assembly may be configured to connect a plurality of sensor modules, in particular, secondary sensor modules, spaced about a central sensor module in a peripheral direction.

The linkage assembly itself may be composed of modules. The kit may comprise various modules that may be assembled to form the linkage assembly and/or at least two different configurations of the linkage assembly. The different variants are preferably configured to be interchangeable with one another.

For example, the kit may comprise a first and a second configuration of a rod assembly, or a first and second rod assembly. The rod assembly may be part of the linkage assembly. In the first configuration, the first rod assembly is preferably configured to connect the at least two sensor modules at the first distance. In the second configuration, the rod assembly is preferably configured to connect the at least two sensor modules at the second distance. The first and second configuration of the rod assembly are preferably configured to be mutually interchangeable, particularly to be mutually interchangeably mounted to a first and second sensor module. Thus, the first and the second rod assembly form exchangeable modules that may be used alternatively. Preferably, no modification to the existing parts is needed to exchange the first rod assembly with the second rod assembly and/or vice versa. This may be accomplished in that the first and the second rod assembly have the same interfaces to connect with the sensor modules.

Of course, the kit may comprise more than two rod assemblies for mounting the at least two sensor modules at more than two distances from one another, each of these distances being different from one another and different from the first and second distance. Alternatively, or cumulatively, the kit may comprise additional rod assemblies to mount additional sensor modules to the at least two sensor modules.

According to another embodiment, the linkage assembly may be configured as a linkage framework, in particular as a truss. For example, the linkage assembly may comprise a plurality of linkage rods or rod assemblies configured to be assembled to a linkage framework or a truss. The truss may include the sensor modules. A linkage framework, in particular a truss, is capable of sustaining high loads at low weight, maintaining the rigidity of the system and therefore keeping sensor distance while minimizing weight and aerodynamic drag.

It is of advantage if at least one of the two sensor modules is configured to be included as a structural element in the linkage framework, in particular the truss. Specifically, at least one of the two sensor modules may be configured as a load-bearing structure of the truss.

At least one, preferably each of the at least two sensor modules may be configured to be located at a node of the truss.

The entire unitary structure including the at least two sensor modules may form a linkage framework or truss.

The linkage assembly or truss may be of modular configuration, to allow assembly of a large number of variants of the unitary airborne structure with as few different parts as possible. For example, the linkage assembly may comprise a plurality of interchangeable linkage rods of different lengths. The lengths of the different linkage rods may be configured so that each linkage rod may be used in at least two different linkage frameworks or rod assemblies. For example, a linkage rod of a certain length may be used as a straight linkage rod in a first truss, formed e.g. by a first rod assembly, which separates two sensor modules at a first distance, and as a diagonal linkage rod in a second truss, formed e.g. by a second rod assembly, which connects the at least two sensor modules at a second distance, which then may be shorter than the first distance. The straight linkage rod may be located in an upstream or downstream plane of the truss or linkage framework, whereas the diagonal linkage rod may extend from the upstream to the downstream plane of the truss or linkage framework.

The linkage rods are made preferably from lightweight material, e.g. a metal material containing or consisting of aluminum, titanium and/or magnesium, and/or a material containing fibers, such as carbon or glass fibers, and/or resin. The cross-sectional shape of the linkage rods, or at least part of the linkage rods, may be aerodynamic, i.e. substantially droplet-shaped. Some or all of the linkage rods however may have a circular or rectangular cross-section.

In the linkage framework or truss, the linkage rods are oriented preferably perpendicular to the flight direction. In this, or in any other reference of an orientation to the flight direction, a deviation from the flight direction due to movements of the towed structure in the airstream in stable flight conditions are still considered as corresponding to the flight direction. Thus, any deviation from the perpendicular direction in the normal course of a stable flight in tow behind the aircraft is still considered perpendicular.

The truss may form or comprise one or more polygonal panels in a projection along the direction of flight. The polygonal panels may be triangular, quadrangular, tetragonal, pentagonal or hexagonal panels, or even comprise more corner points. A sensor module may be located at each of the corner points of such a panel. A corner point may connect neighboring panels of the truss.

A truss structure made up of polygonal panels may be easily expanded to carry any number of sensor modules simply by adding further panels.

The truss or linkage framework may comprise an upstream plane and a downstream plane, the upstream plane being located upstream of the downstream plane with respect to the flight direction. The upstream plane of the truss may be defined by leading linkage rods, which extend perpendicular to the flight direction and are connected to an upstream section of a sensor module. The downstream plane may be defined by the trailing linkage rods, which are connected to a sensor module at an aft section thereof. Diagonal linkage rods may extend both in an upstream/downstream direction and a direction perpendicular to the flight direction between a leading linkage rod and a trailing linkage rod, preferably within the plane defined by the leading and trailing linkage rods. The diagonal linkage rods stiffen the truss.

A sensor module may also be of modular structure. The kit may comprise various interchangeable parts that may be combined to form different variants of sensor modules.

For example, the kit may comprise at least two interchangeable tip modules, wherein each of the at least two interchangeable tip modules are configured to be part of the sensor module.

At least one of the two interchangeable tip modules may be configured to house electric or electronic components.

For example, the kit may comprise, as a tip module, a central electronics module that is configured to house main electric and electronic components, such as the communication electronics mentioned above. The main electric and electronic components are also used by other sensor modules, and may comprise an energy source, a controller for the geophysical sensor, communications electronics and/or a geolocation sensor. The central electronics module may be used to assemble a central sensor module. The central electronics module may comprise one or more electric connectors to connect to complementary connectors of signal and/or energy supply lines or of other modules.

The kit may in particular comprise at least two different electronics modules providing differently sized housing space for electric or electronic components. For example, a secondary electronics module may be provided in addition to the central electronics module. The secondary electronics module may be smaller than the main electronics module. The secondary electronics module may provide a smaller volume for receiving electric or electronic components than the main electronics module. The main electronics module may be used e.g. in cases where a large energy supply is needed.

At least some tip modules may include electric connectors that are configured to be connected to mating connectors of other modules of the kit. The smaller tip module may be used to e.g. house a controller for the geophysical sensor. Of course, electric or electronic components may be housed in the fuselage module in addition or alternatively to the tip module.

The kit may comprise a dummy tip module, which may not provide a dedicated space for housing electronic components. A dummy tip module may e.g. be used for secondary sensor modules. Again, the kit may comprise different dummy tip modules. For example, at least one variant of a dummy tip module comprising fins and at least one variant of a dummy tip module without fins may be included by the kit. Such a dummy tip module may be used to adjust the aerodynamic properties, in particular the flight characteristics, of the unitary structure.

According to another embodiment, the kit may comprise at least one empennage module. The empennage module may comprise one or more fins and may be configured to be a module or part of the sensor module. In particular, the empannage may comprise a plurality of sets of different fins that may be interchangeably mounted on at least one of the empannage The various fins may be interchangeably attached to the tip module, the empennage module and/or the fuselage module. If no empennage module is provided, the fins may be configured to be directly and preferably interchangeably mounted onto the fuselage module. An empennage module, a fuselage module and/or a tip module may comprise one or more attachment sections of which each is configured to receive a fin.

The empennage module may be formed as a tail end of a sensor module.

The empennage module may itself be of modular structure. The kit may comprise of modules that are configured to be assembled to an empennage module. The modules that are configured to be assembled to an empennage module may comprise different interchangeable variants of fins.

It is further advantageous if the kit comprises a fuselage module, which is configured to be part of a sensor module. In particular, the kit may comprise a plurality of different interchangeable fuselage modules, e.g. fuselage modules of different lengths. The one or more fuselage modules may be tube-like. To simplify the kit, the fuselage module may be also used as a linkage rod or be identical to a linkage rod. Alternatively, the fuselage module may be formed from the same stock material as a linkage rod. The fuselage module may comprise one or more electric connectors e.g. at one end, being configured to be connected to at least one complementary connector of a tip module.

The fuselage module may comprise an aerodynamic tip, which may be formed droplet-like or bulb-like. Moreover, the fuselage module does not need to be tube or rod-like, but have a droplet-like or bulb-like shape.

The kit may comprise a geosensor module. The geosensor module may be configured to house at least one geosensor for geophysical measurements. The geosensor module may be configured to be a part of the sensor module. In particular, the geosensor module may be formed as a tail section of the sensor module or as a front section of the sensor module. A plurality of different geosensor modules may be used to house sensors of different size.

The geosensor module may comprise one or more electric connectors that are complementary to the one or more connectors of the fuselage module and/or the one or more electric connectors of the tip module.

It is preferred if the modules can be used interchangeably in any combination. For example, any or none of the fuselage modules and the empennage modules may be provided between the tip module and the geosensor module. Any tip module may be directly mounted to the geosensor module. Alternatively, a fuselage or an empennage module may be located between the tip module and the geosensor module. Further, both the fuselage module and the empennage module may be arranged between the tip module and the geosensor module, the order of the empennage module and the fuselage module may be arbitrary. Further, more than one fuselage module may be located between the tip module at the upstream end and the empennage module and/or the geosensor module at the tail end of the sensor module.

This modular interchangeability may be achieved in that the at least two of the group comprising the one or more fuselage modules, the one or more tip modules, the one or more geosensor modules and the one or more empennage modules are provided with mutually complementary interfaces for attachment and/or electric connection.

In one embodiment, the downstream facing end of any module configured to be connected to another module may have an electric and/or mechanical interface that is configured to be mated with the upstream facing end of any other module that is configured to connected to an upstream module.

For example, the tip module may be mounted interchangeably to the fuselage module, to the empennage module or to the geosensor module. The geosensor module may be mounted interchangeably to the fuselage module, the empennage module and to the tip module. The fuselage module may be mounted interchangeably to the empennage module and the geosensor module at one end thereof.

Complementary interfaces, which allow for such interchangeability, are e.g. bayonet couplings, screw couplings, or other types of mechanical couplings.

The kit may further comprise a joint module, which is configured to be mounted equally on any of the at least two sensor modules, e.g. on a fuselage module. The joint may comprise a plurality of attachment members providing different attachment points for mechanically connecting the linkage assembly to a sensor module or a fuselage module. The attachment points may be arranged in particular along a circumferential direction of the sensor module or the fuselage module, the circumferential direction being directed about the direction of flight.

The joint module may for example have an opening, which is configured to receive the sensor module.

In the following, embodiments of the invention are exemplarily described with reference to the accompanying drawings. In the drawings, elements, which correspond to one another with respect to their structure and/or function, are provided with the same reference numeral.

According to the above description of possible additional features, any feature that is described as being part of an embodiment may be omitted from the embodiment if its technical effect is not needed for a specific application. Vice versa, a feature described above that is not part of an embodiment, may be added to the embodiment if its technical effect is of advantage in a specific application.

Figure 1:
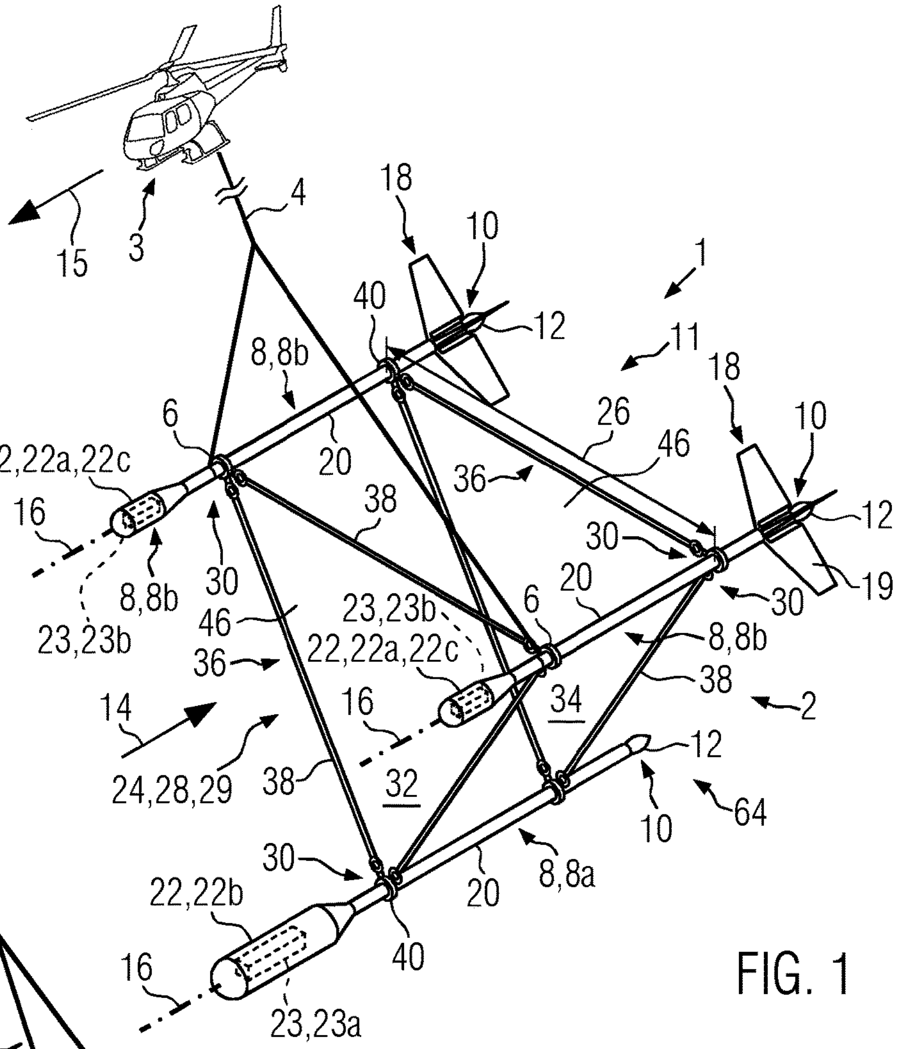
FIG. 1 shows a schematic perspective view of an airborne, unitary structure for geophysical measurements assembled from a modular kit.

First, an example of a unitary, airborne structure 1 for geophysical measurements is described with reference to FIG. 1. The structure 1 is modular and assembled from interchangeable components, i.e. modules, of a kit 2 that is described further below.

The structure 1 is configured to be towed by an aircraft 3, such as a helicopter, an airplane or an unmanned aerial vehicle. To be towed, the structure 1 is configured to be connected to the aircraft by a towing member 4, which, for example may be a towing line, towing cable or towing rod. The towing structure may comprise one or more tow anchors 6, to which the towing member 4 may be attached.

The structure 1 comprises two or more sensor modules 8. In FIG. 1, three sensor modules 8 are shown just by way of example.

Each sensor module 8 houses at least one geophysical sensor 10 in the tail section or in the tip section, for example a magnetometer. In the structure, the geophysical sensors 10 of the structure 1 are arranged in an array 11. By way of example only, the array 11 shown in FIG. 1 is triangular.

Each sensor module 8 may itself be modularly composed of interchangeable components. For example, the geophysical sensor 10 may be housed in a geosensor module 12, shown here by way of example at a tail section of a sensor module 8.

In the configuration shown in FIG. 1, the sensor modules are of missile, droplet or torpedo shape, elongated along a flow direction 14, which is aligned with a longitudinal axis of a sensor module. The flow direction 14 is—except for small deviations about a stable flight position of the structure 1—antiparallel to a direction of flight 15 of the aircraft 2. Of course, during flight, the longitudinal axis 16 may deviate from the flow direction 14. Such deviations within the regime of stable flight conditions under tow are considered to still constitute an alignment.

In the structure 1, the sensor modules 8 are arranged with their longitudinal axes 16 parallel to one another.

At least some of the sensor modules 8 may be provided with an empennage module 18. The empennage module 18 may be placed between a fuselage module 20 of the sensor module 8 and the geosensor module 12. Alternatively, as shown in the lowest sensor module 8 in FIG. 1, the geosensor module 12 may be directly connected to the fuselage module 20 without interposition of an empennage module 18. The empennage module comprises one or more fins 19. The kit 2 may comprise sets of different fins 19, that may be exchanged with one another. Selecting an appropriate set of fins 19 allows to adapt the aerodynamic properties of the empennage modules 18 to the lay-out of the structure 1. Alternatively, the fins 19, or sets of different fins 19, may be mounted directly and interchangeably onto the fuselage module 20. In this case, an empennage module 18 is not necessary.

Each of the sensor modules 8 further comprises a tip module 22. Some of the sensor modules 8, for example in FIG. 1 the upper two sensor modules 8, may have different tip modules 22, e.g. a dummy module **22*a* than the other, lowest sensor module 8, which may comprise a tip module 22 which is configured as a main electronics module 22*b*. A tip module, such as the main electronics module 22*b* may be configured to house electric or electronic components 23. The main electronics module 22*b* may house one or more main electric or electronic components 23*a* that are needed only once within the entire structure 1, such as a geonavigation sensor and/or communication electronics, such as WLAN, Bluetooth, radio or other sender/receivers, and/or an energy source, such as a battery, which supplies energy to all sensor modules 8 of the structure 1. The main electric or electronic components 23***b* may be used by the secondary sensor modules 8*b*. A dummy module 22*a* may serve aerodynamic properties, e.g. by comprising airflow guiding means such as the fins 19 at the tip and/or tail section Instead of dummy module 22*a*, a secondary electronics module 22*c* may be used to house one or more secondary electric or electronic components 23*b*, such as a controller of the geophysical sensor of the respective sensor module 8, here a secondary sensor module 8*b*. The one or more secondary electric or electronic components 23*b* may be used only by the secondary sensor module 8*b* that carries these components 23*b*. The secondary electric or electronic components 23*b* in an array may be powered by the main electric or electronic components 23*b*. The secondary electric or electronic components 23*b* may be in a client relationship to the main electric or electronic components 23*a*.

All components or modules of the sensor module 8 are preferably interchangeable with one another, so that any permutation of modules can be used to assemble a sensor module 8.

The structure 1 further comprises a linkage assembly 24 which connects the at least two sensor modules 8 rigidly with one another at a distance 26 from one another.

As can be seen from FIG. 1, the linkage assembly 24 forms a linkage framework 28 that connects the sensor modules 8 to one another. In particular, the linkage assembly 24 may be a truss 29 or have a truss-like form. The sensor modules 8 may be located at nodes 30 of the linkage framework 28. The sensor modules 8, specifically the fuselage modules 20 may be configured to be load-bearing structures of the linkage framework 28.

The linkage framework 28 may be arranged in an upstream plane 32 and a downstream plane 34. The upstream plane 32 and the downstream plane 34 may extend perpendicular to the flight direction. The upstream plane 32 and the downstream plane 34 of the linkage framework 28 may be connected by the sensor modules 8, in particular by the fuselage modules 20.

The linkage framework 28 may be comprised of one or more rod assemblies 36 which are assembled from linkage rods 38. The linkage rods 38 may be made from carbon fiber and be hollow. The linkage rods 38 extend transversely to the flow direction 14. They may have a cylindrical or aerodynamic cross-section. The linkage rods 38 can be of any length and can thus be a way to scale the system up or down.

The sensor modules 8 may comprise a joint 40. The joint 40 may be configured to be connected to any desired number of linkage rods.

The structure 1 of FIG. 1 has a triangular configuration in a projection along the flow direction 14. Thus, two linkage rods 38 are connected to one another and to a sensor module 8 by a joint 40.

The linkage assembly 24, in particular the linkage rods 38, or at least some of the linkage rods 38, may be configured to receive in their interior (not shown), electric lines for power and/or signal transmission between the various sensor modules 8.

In the structure 1 of FIG. 1, the sensor module 8 comprising the communications module 22*b* is a central or "mother" sensor module 8*a* as it houses the communication interface to the processing site. The two remaining sensor modules or, for that matter, any remaining sensor module 8, may be a secondary, client or "daughter" sensor module 8*b*, which communicates only with the central sensor module 8*a*. Thus, the communication structure is also modular in that any number of secondary sensor modules 8*b* may be added in whatever physical structure to an existing central sensor module 8*a*. The triangular structure of FIG. 1 may be considered as a basic, modular building block for composing more complex structures 1 comprising a larger number of sensor modules 8.

Figure 2:
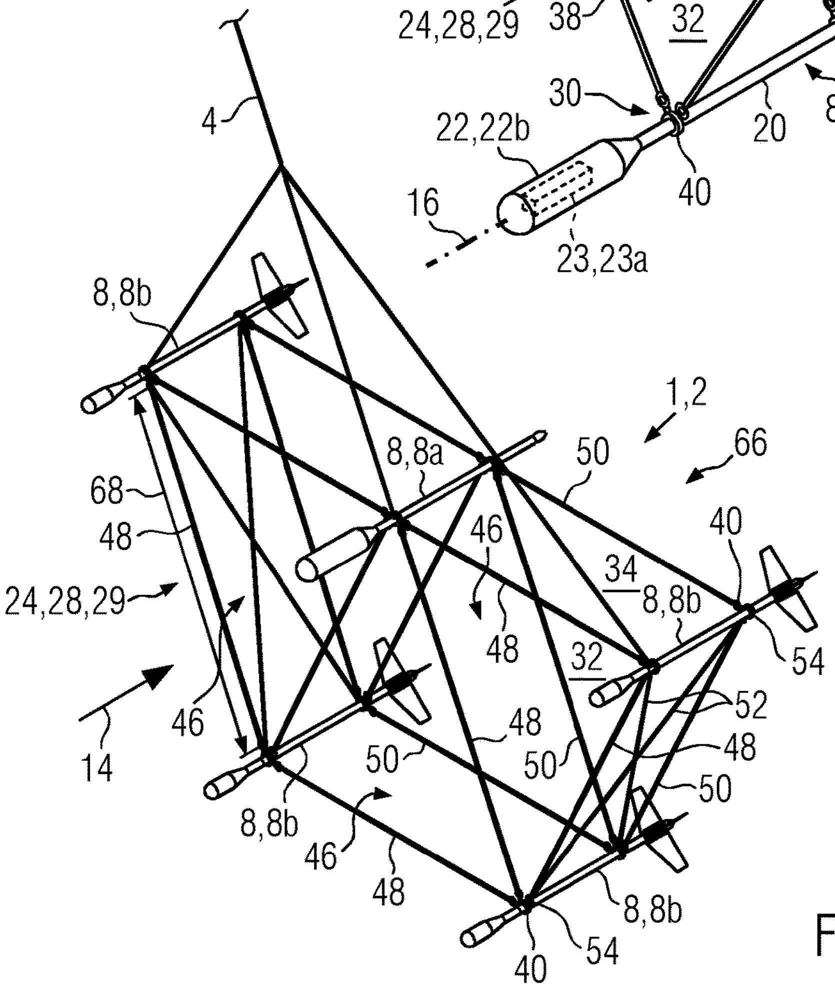
FIG. 2 shows a schematic perspective view of another airborne unitary structure assembled from the same kit as the structure in FIG. 1.

For example, as shown in FIG. 2, the structure 1 may comprise five sensor modules 8, of which four are secondary modules 8*b* and one is a central sensor module 8*a*. The entire structure 1 is formed as a linkage framework 28 or, more specifically, as a truss 29, composed of triangular panels or truss units 46. The entire truss 29 or linkage framework 28 and each of the panels 46 may frame an upstream plane 32 and a downstream plane 34. As in FIG. 1, the upstream plane 32 may be framed by upstream rods 48, whereas a downstream plane 34 may be framed by downstream rods 50. In at least some panels, diagonal rods 52 may be provided that extend diagonally and transverse to the flow direction 14 between an upstream rod 48 and the downstream rod 50 located downstream of the upstream rod 48. In particular, a diagonal rod or tension cable 52 may extend between an end 54 of an upstream rod 48 to the end 54 of a downstream rod 50, the two ends 54 being located at two different sensor modules 8. The diagonal rods or cables 52 may be connected to the same joint 40 as the upstream rods 48 and the downstream rods 50 or to separate joints 40, also located on the sensor modules 8.

The panels 46 of course do not need to be triangular, although a triangular configuration offers very high stiffness. Any polygonal configuration, such as tetragonal, pentagonal, hexagonal etc. may be used. The diagonal rods 52 may be located at any position and in any numbers where necessary.

Figure 3:
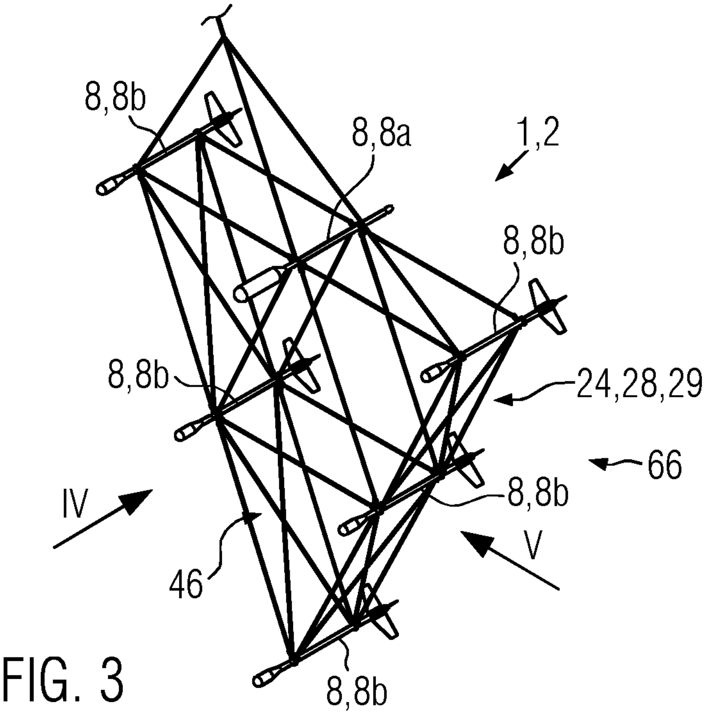
FIG. 3 shows a schematic perspective view of another airborne, unitary structure assembled from the same kit as in FIG. 1.

In FIG. 3, a structure 1 is shown, which, compared to the structure 1 of FIG. 2, comprises an additional secondary sensor module 8*b* by adding another truss unit or panel 46 at the bottom of the structure 1 of FIG. 2.

Figure 4:
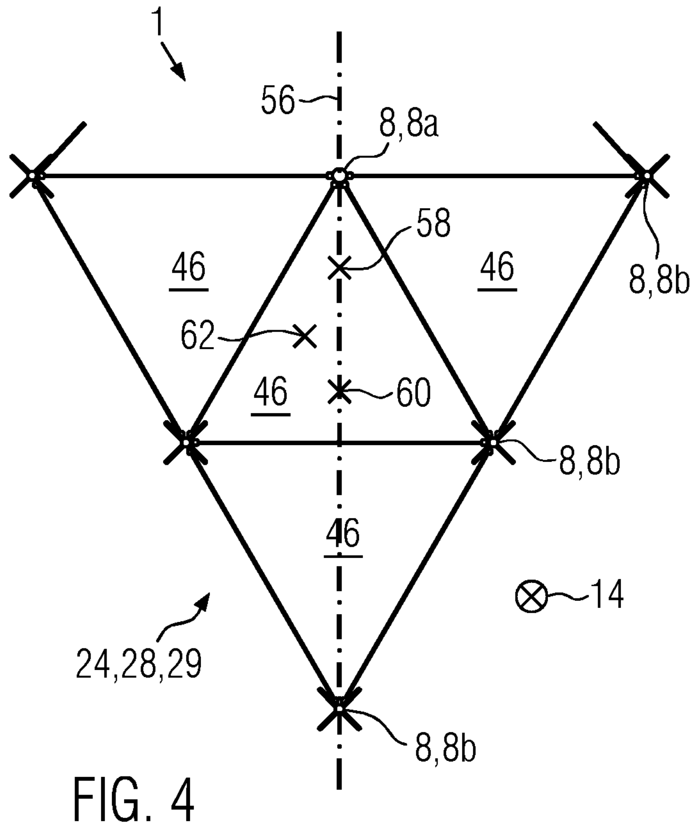
FIG. 4 shows a schematic view in a downstream direction IV of FIG. 3.

The triangular structure of the truss units 46 can be seen clearly in FIG. 4.

Figure 5:
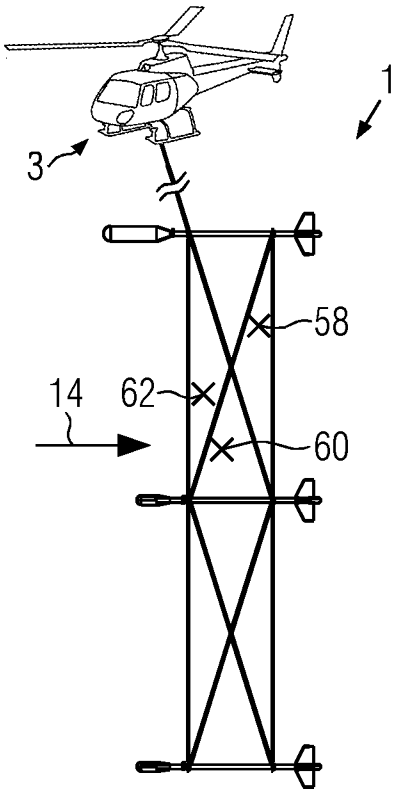
FIG. 5 shows a schematic view in a direction V perpendicular to the direction IV of FIG. 3.

The structure 1 is aerodynamically stable in all embodiments. Aerodynamic stability may be reached in that the structure 1 is symmetric with respect to a plane of symmetry 56 that is, in operation of the structure 1, vertical and parallel to the flow of light direction 14. An aerodynamic center 58, i.e. the location, through which the aerodynamic forces acting on the structure 1 are directed and a center of gravity 60 of the structure 1 are located in the plane of symmetry 56 or at least as close as possible to the plane of symmetry 56. Further, the aerodynamic center 58 is preferably located above the center of gravity 60 (FIG. 4). Further, the aerodynamic center 58 may be located downstream of the center of gravity 60 as shown in FIG. 5, to increase aerodynamic stability. Further, the aerodynamic center 58 is preferably downstream of an instantaneous center of rotation 62.

The empennage modules 18 with their fins 19 are arranged such that the aerodynamic center 58 obtains the above-described location, e.g. by having appropriate fins 19. Additionally, tip modules also having fins may be provided. Further, interchangeable empennage modules, tip modules and/or joints 40 may be comprised by the kit 2, which each have a different drag coefficient. Increasing the drag, in particular at locations far away from the aerodynamic center 58 increases the dampening of any oscillations during flight.

Thus, empennage, tip and/or joint modules at locations of the structure 1, which are placed remote from the aerodynamic center 58 may have a larger effect than at locations of the structure 1 which are closer to the aerodynamic center 58. For example, as shown in FIGS. 1 to 3, it may be beneficial that the sensor module 8, which is located at the plane of symmetry 56 of the structure 1 does not comprise fins 19 or an empennage module 18. In FIGS. 1 to 3, this sensor module is, just by way of example, a center module 8*a*. Of course, a secondary module 8*b* may be located at this position as well.

The kit 2 comprises a linkage assembly 24, which may comprise at least two different configurations 64, 66. A first configuration 64 is shown e.g. in FIG. 1. In the first configuration 64, the at least two sensor modules 8 are spaced apart from another at the (first) distance 26. In a second configuration 66 shown for example in FIG. 2, the sensor modules 8 may be spaced apart from one another in a second distance 68, which is different from the first distance 26. In FIGS. 1 and 2, the second distance 68 is for example larger than the first distance 26. The first configuration 64 may be assumed by a first rod assembly 36, i.e. a first combination of linkage rods 38. The second configuration 66 may be assumed by a second rod assembly 38, i.e. a second combination of linkage rods 38. Alternatively or additionally, the second configuration 66 may differ from the first configuration 64 with respect to the number of sensor modules 8. This allows to adapt the structure 1 to a great variety of measurement applications.

The first and second configuration, 64, 66, may be provided in that the linkage assembly 24 comprises linkage rods 38 of different lengths. Thus, although the geometry of a truss panel or truss unit 46 may not change, its dimensions may be changed by using linkage rods 38 of different length. This allows to compose structures 1, in which the distance 26, 68 between the sensor modules is adapted fora specific measurement task e.g. for detection of structures within a certain range of dimensions.

The linkage rods 38 of the kit 2 may have a graduation in length that allows them to be used in more than one different configuration 64, 66. For example, the diagonal linkage rods 52 of a first configuration 64 may be used in a second configuration 66 as upstream or downstream rods 48, to arrange the sensor modules 8 at a larger distance from another.

FIGS. 1 to 4 demonstrate the scalability of the structure 1. The modular structure allows to add any number of sensor modules 8 and to locate the individual sensor modules at any individual distance from one another. Moreover, once a central sensor module 8*a* is present in the structure, only secondary sensor modules 8*b* need to be added.

Figure 6:
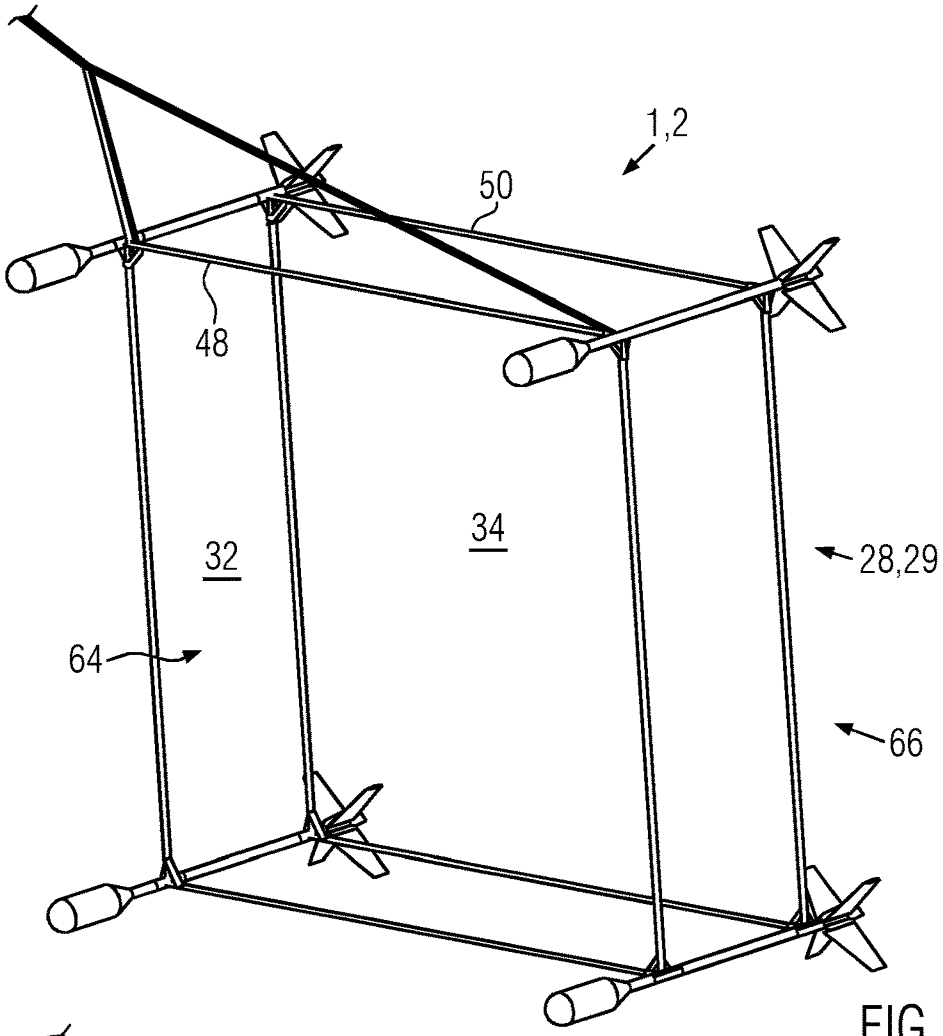
FIG. 6 shows a schematic perspective view of another airborne unitary structure assembled from the same kit as FIG. 1.
Figure 7:
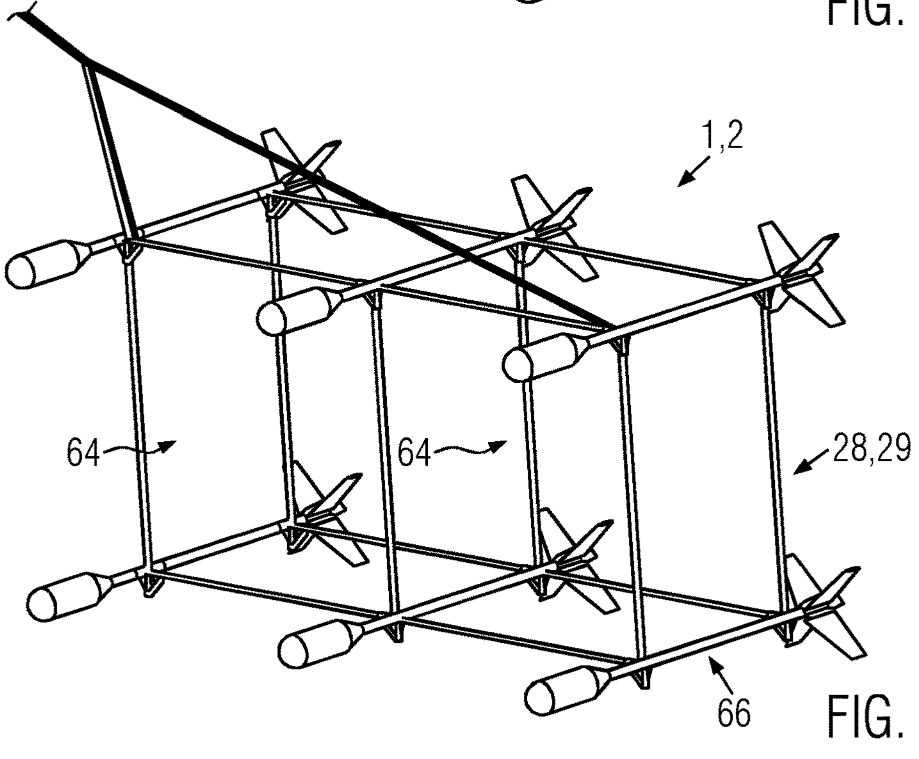
FIG. 7 shows a schematic perspective view of another airborne unitary structure assembled from the same kit as FIG. 1.

The versatility of the structure 1 is further demonstrated with reference to FIG. 6, which is based on a truss 29 which has quadrangular panels 64 instead of triangular panels as in the previous figures. Again, the structure is1 is scalable by simply adding more panels, as shown in FIG. 7, where a second panel 46 with two more in particular secondary sensor modules has been added. Other than the different geometry of the truss, the kit and the components of the structures 1 of FIGS. 6 and 7 are the same as used for the structures in FIGS. 1 to 5.

The kit 2 may be configured for assembly of a linkage assembly 24 that is collapsible and/or the structure 1 may comprise a linkage assembly 24 that is collapsible. A collapsible version of the linkage assembly 24 is denoted with the reference numeral 24*a* in the following.

Preferably, the kit 2 contains interchangeable modules which are configured to be assembled as a collapsible linkage assembly 24*a*. The collapsible linkage assembly 24*a* preferably comprises modules, or assembled from modules, for example linkage rods 38 that can also be used to assemble non-collapsible linkage assemblies 24 as shown e.g. in the preceding Figures. Further, the collapsible linkage assembly 24*a* may be assembled using one or more joints 40 that can also be used to assemble non-collapsible linkage assemblies 24.

Figure 8:
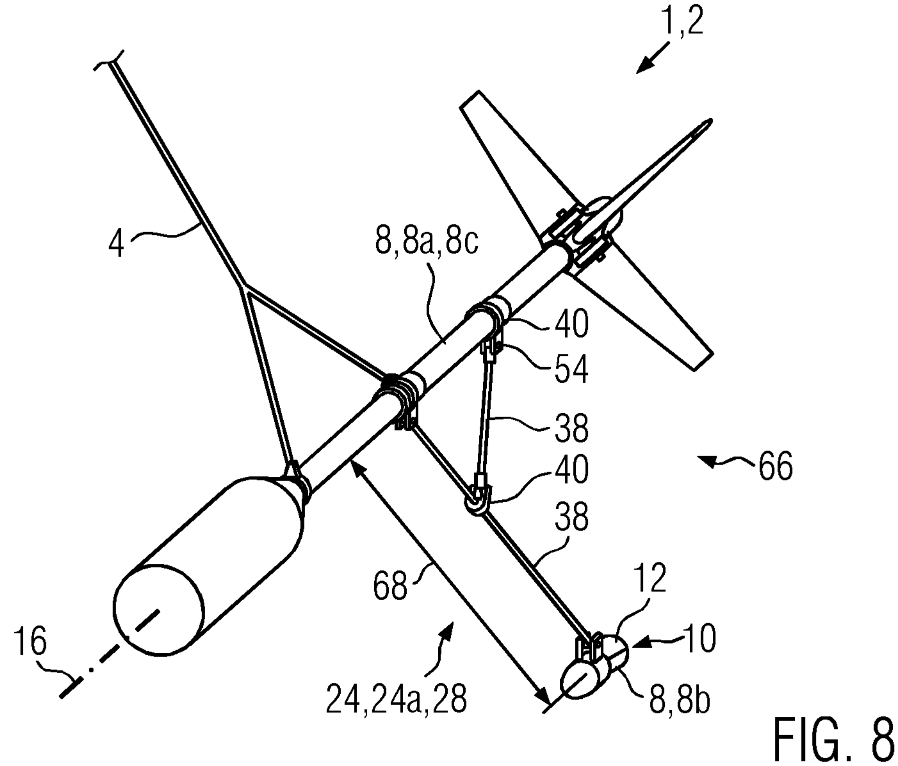
FIG. 8 shows a schematic perspective view of a unitary, airborne structure for geophysical measurements assembled at least partly from the same kit as the structure of FIG. 1.
Figure 9:
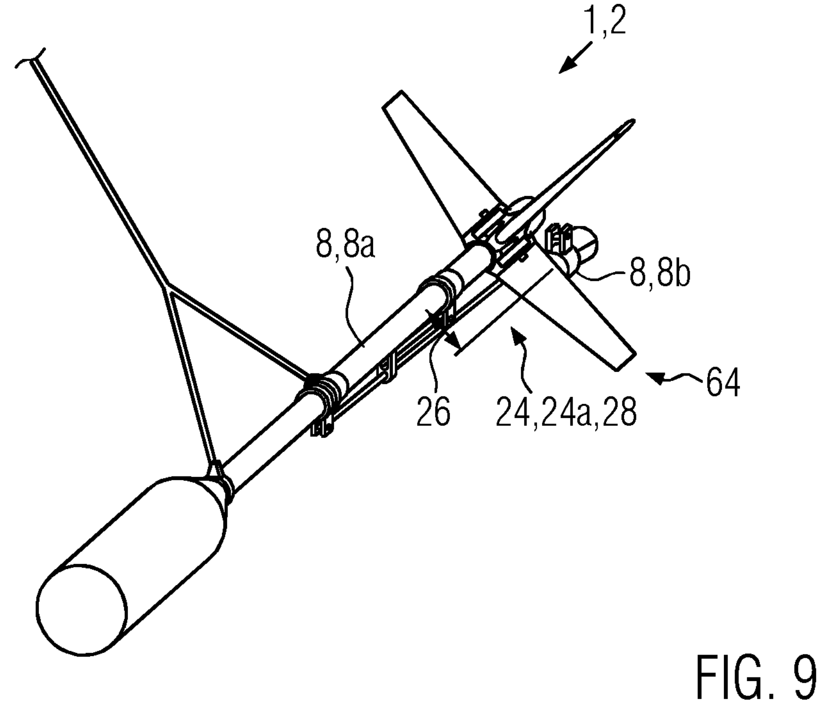
FIG. 9 shows a schematic perspective view of the structure of FIG. 8 in another operational state.

Examples of collapsible linkage assemblies 24*a* are now described with reference to FIGS. 8 to 11. The collapsible linkage assembly 24 may contain the same central sensor module 8*a* as the modular structure in FIGS. 1 to 7. First, the collapsible linkage assembly 24*a* of FIGS. 8 and 9 is described.

The collapsible linkage assembly 24*a* is configured to rigidly connect at least two sensor modules 8 at two different distances 26, 68 from one another. In the first configuration 64, shown in FIG. 9, the linkage assembly 24*a* is collapsed so that the sensor modules 8 are arranged from another in the first, smaller distance 26. The collapsible linkage assembly 24*a* may be formed by a collapsible rod assembly 36. This configuration may be used e.g. for transporting the structure 1. In the second configuration 66 shown in FIG. 8, the structure 1 may be ready for operation and the distance 68 between the sensor modules 8 is larger than at the second configuration.

A collapsible linkage assembly 24*a* may e.g. comprise a telescoping linkage rod 38 or a telescoping rod assembly 36, comprising a plurality of telescoping linkage rods 38 (not shown). Alternatively, an umbrella-like collapsible structure may be used. The collapsible linkage assembly 24*a* may comprise two or more linkage rods 38 that can be moved translationally and/or rotationally relative to one another. One end 54 of a linkage rod 28 may be connected to a joint 40 which may be slid along the longitudinal axis 16 of one sensor module 8.

A collapsible linkage assembly 24*a* may be particularly useful if small secondary sensor modules 8*b* are used which do not put much strain on the linkage assembly during flight.

With the modular configuration of the kit 2, such a small secondary sensor module may be assembled by mounting a geosensor module 12 directly to a tip module 22 and e.g. omitting the fuselage module 20 and the empennage module 18. The linkage rods 38 to be used in the collapsible linkage assembly 24*a* are preferably the same or of the same material that is used in the kit too for assembling the linkage assembly 24 or, in some instances, the truss 29.

In the case of a collapsing linkage assembly 24*a*, one sensor module 8, which may particularly be a central sensor module 8*a*, may be configured as a carrier module 8*c* which carries the remaining one or more sensor modules of the structure 1. Due to the modular structure of the kit 2, two or more carrier modules 8*c* may be connected with one another using the linkage assembly 24 shown in any one of FIGS. 1 to 5, e.g. configured as part of a truss 29.

Again, any power supply or data connection may take place via the linkage assembly 24, in particular via one of the linkage rods, as described above in the context of the truss 29.

A collapsible linkage assembly 24*a* may couple any number of sensor modules 8 to a carrier module 8*c* by arranging the sensor modules 8 around the carrier sensor module 8*c* in a peripheral direction 70 about the longitudinal axis 16 of the carrier sensor module 8*c*, as in an umbrella.

Figure 10:
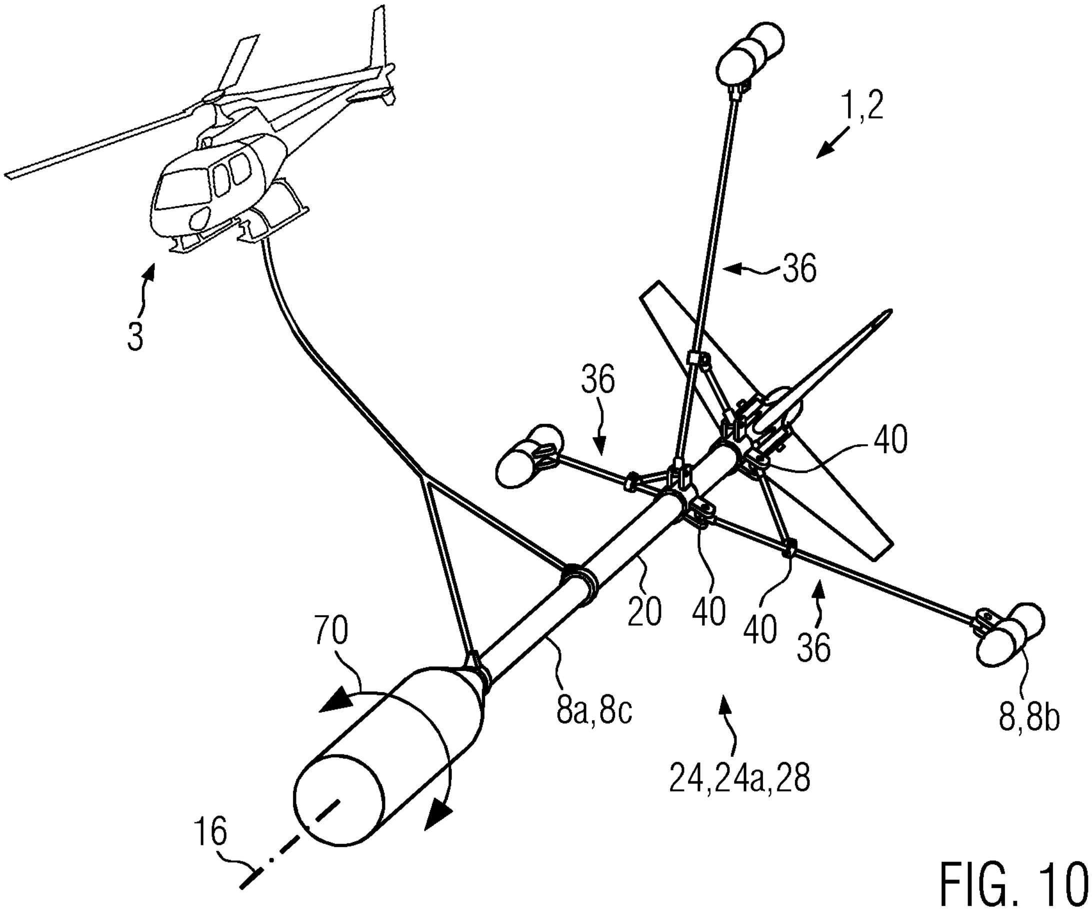
FIG. 10 shows a schematic perspective view of an airborne, unitary structure made from the same kit as the structure in FIG. 8.
Figure 11:
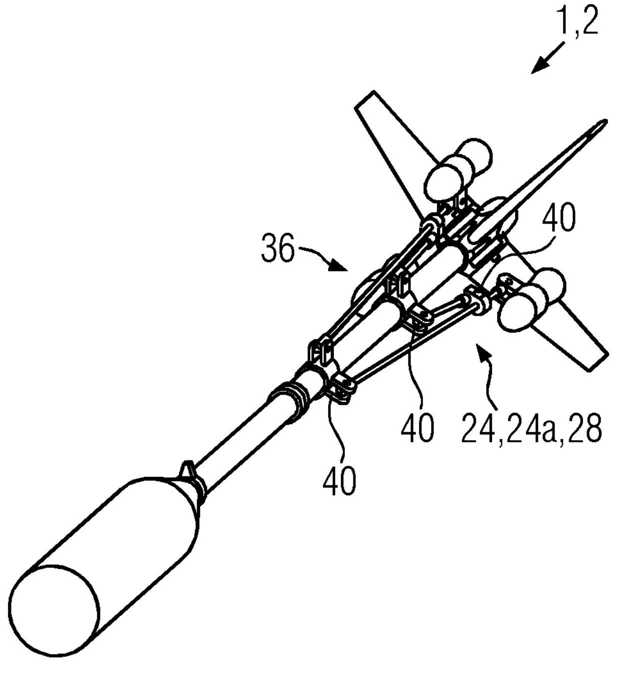
FIG. 11 shows a schematic, perspective view of the structure of FIG. 10 in a different operational state.

For example, as shown in FIGS. 10 and 11, three secondary sensor modules 8, 8*b* may be arranged evenly spaced from one another in the peripheral direction 70 around the longitudinal axis 16 of the carrier sensor module 8*c*. This structure may be assembled by using the same linkage rods 38 that are used for connecting one sensor module 8 to the carrier sensor module 8*c* as in FIGS. 8 and 9. However, a different joint 40 may be used and comprised by the kit 2, which joint provides the required number and location of attachment points for attaching more secondary sensor modules 8*b* via the respective collapsible linkage assembly 24*a*. At least one joint 40 may be configured to be slid along the carrier sensor module 8*c*, in particular along the fuselage module 20, and be fixed at any position along its path.

Except for the number of sensor modules 8 attached by the collapsible linkage assembly 24*a* to the carrier sensor module 8*c*, the function of the structure 1 made from the kit 2 shown in FIGS. 8 and 9 corresponds to the structure shown in FIGS. 8 and 9.

Figure 12:
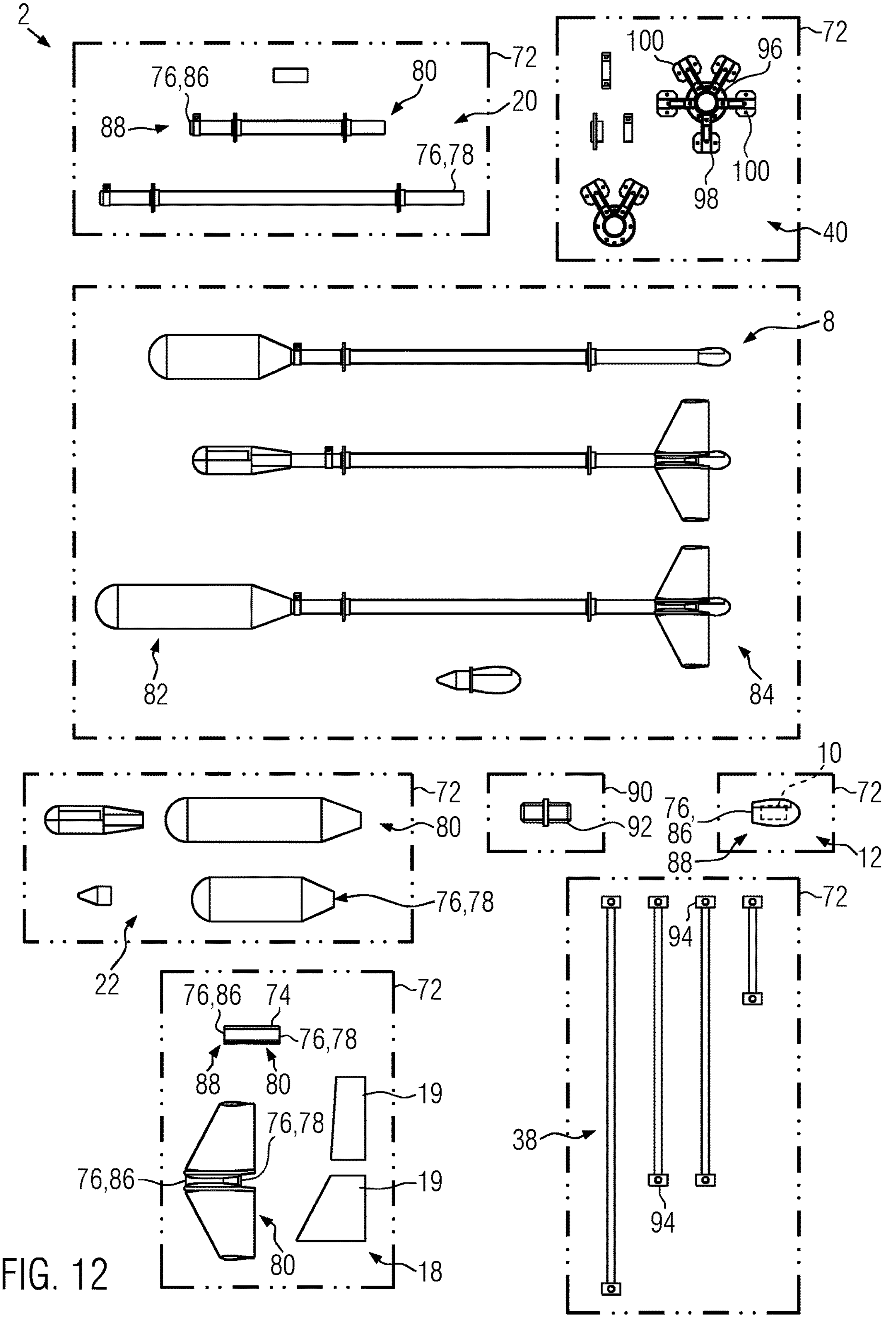
FIG. 12 shows a schematic view of exemplary components of a kit for assembling a structure as shown in FIGS. 1 to 11.

FIG. 12 shows an exemplary kit 2. The kit 2 comprises a variety of different modules 72 for assembling a sensor module 8 or a linkage assembly 24 in any of the aforementioned configurations.

For example, the kit 2 may comprise different fuselage modules 20 that may be used interchangeably for assembling a sensor module 8.

The kit 2 may comprise different tip modules 22 that may be used interchangeably to assemble a sensor module 8.

The kit 2 may comprise one or more empennage modules 72. The empennage module 72 may itself be of modular structure and comprise a fin attachment module, to which different fins 19 may be interchangeably mounted. Alternatively, the different empennage modules 72 may comprise different fins 19.

The different modules 72 of the kit 2 that are configured to be assembled to a sensor module 8 comprise complementary interfaces 76 which may include respective mechanicals and/or electric connectors. An interface 76 may be e.g. a downstream-facing interface 78 at a downstream end 80 of the respective module 72. The downstream end 80 is defined by the position of the respective module 72 in an assemble sensor module 8. For example, a tip module 22 only needs a downstream-facing interface 78, as a tip module 22 is configured to constitute the upstream end of the sensor module 8.

Modules 72 that are configured to be located in an assembled sensor module 8 between a module 72 at the upstream end 82 of the sensor module and the module 72 at the downstream end 84 of the sensor module 8 may also comprise an upstream facing interface 86 at their respective upstream ends 88. The upstream-facing interface 86 and the downstream-facing interface 78 may be complementary, e.g. by comprising complementary parts of a bayonet coupling, an outer thread and an inner thread or any other coupling, and/or by comprising complementary electric connectors. Each upstream-facing interface 86 may be attached to each downstream-facing interface 78. Alternatively, an adaptor 90 may be provided which is configured to connect any two modules 72 with one another. For example, such an adaptor may comprise two outer threads 92 that may be brought into engagement with respective inner threads of the modules 72.

Using any of the above configurations, a tip module 22 may be connected with any of an empennage module 18, a fuselage module 20 and a geosensor module 12. The geosensor module 12 may be connected with any of an empennage module 18, a tip module and a fuselage module Thus, a sensor module 8 may be composed without using a fuselage module 20 and/or an empennage module 18.

The kit 2 may further comprise a linkage assembly 24 as e.g. described in the context of FIGS. 1 to 11. The linkage assembly 24 may also be modular and also comprise modules 72, e.g. linkage rods 38 of different lengths. The linkage rods 38 may be the basic component to compose a linkage assembly either as a collapsible linkage assembly 24 as shown in FIGS. 8 to 11 or as stationary linkage assembly 24 as shown in FIGS. 1 to 7.

The linkage rods 38 comprise preferably identical mounting interfaces 94 at both their ends, so that they can be used interchangeably to allow composition of linkage assemblies 24 in at least two different configurations 64, 66.

Finally, the kit 72 may comprise joints 40 of different configurations, which may also be used interchangeably. The joints 40 are configured to connect one or more linkage rods 38 to a sensor module 8, in particular to a fuselage section 20.

The kit may for example comprise at least one joint 40 that is configured to couple two linkage rods 36 allowing a rotational movement of the two rods relative to one another. The kit 2 may comprise at least one joint that is configured to be mounted onto a fuselage module 20 or that may be used interchangeably with a fuselage module 20, e.g. by having interfaces such as upstream and downstream facing interfaces 76, 78, 88. The kit may comprise at least one joint 40 that is configured to be mounted on and along a fuselage module 20.

For example, a joining 40 may comprise a ring or ring-like component 96, which is configured to be attached to one or more attachment points 98, which themselves are configured to be attached to a linkage rod 38. By choosing the appropriate number and location of attachment parts 98 on a ring 96, the geometry of a truss 28 may be selected. The ring and the attachment parts 98 may comprise one or more baffle surfaces 100 which are oriented perpendicular to the flow direction 14 in the structure 1 in operation. The baffle surfaces 100 generate drag and thus ensure damping of any positional oscillation of the structure 1 during flight.

REFERENCE NUMERALS

1. structure
2. kit
3 aircraft
4. towing member
6. tow anchor
8. sensor module
8*a*. central sensor module
8*b*. secondary sensor module
8*c*. carrier sensor module
10. geophysical sensor
11. array
12. geosensor module
14. flow direction
15. direction of flight
16. longitudinal axis of sensor module
18. empennage module
19 fin
20. fuselage module
22. tip module
22*a*. dummy module
22*b*. central electronics module
22*c*. secondary electronics module
23. electric or electronic component(s)
23*a*. main electric or electronic component(s)

23*a*. secondary electric or electronic component(s)
24. linkage assembly
24*a* collapsible linkage assembly
26. distance between adjacent sensor modules
28. linkage framework
29. truss
30. node of linkage framework or truss
32. upstream plane of linkage framework or truss
34. downstream plane of linkage framework of truss
36. rod assembly
38. linkage rod
40. joint
46. panel of truss or truss unit
48. upstream rod
50. downstream rod
52. diagonal rod
54. end of rod
56. vertical plane of symmetry of structure
58. aerodynamic center of structure
60. center of gravity of structure
62. center of rotation of structure
64. first configuration
66. second configuration
68. second distance between adjacent sensor modules
70. peripheral direction
72. modules of kit
74. fin attachment module
76. interface
78. downstream-facing interface
80. downstream end of a module
82. upstream end of sensor module
84. downstream end of sensor module
86. upstream-facing interface
88. upstream end of module
90. adaptor to connect modules
92. outer thread section
94. mounting interface of linkage assembly
96. ring
98. attachment point
100. baffle surface

The invention claimed is:

1. A kit for assembling an airborne unitary structure of an array of geophysical sensors, the unitary structure being configured to be towed by an aircraft, the kit comprising:

at least two sensor modules, each sensor module of the at least two sensor modules being configured to house at least one of the geophysical sensors; and a linkage assembly, the linkage assembly being configured to rigidly connect the at least two sensor modules with one another spaced apart from one another;

wherein the linkage assembly is configured to be assembled in a first configuration and in a second configuration, wherein the first configuration differs from the second configuration in at least one of a distance between the at least two sensor modules and the number of sensor modules in the array;

wherein the linkage assembly comprises at least one collapsible rod assembly.

2. The kit according to claim 1, wherein the linkage assembly is configured to house an electric line connecting the at least two sensor modules.

3. The kit according to claim 1, wherein the linkage assembly comprises a first configuration of a rod assembly and a second configuration of a rod assembly, the first configuration being configured to connect the at least two sensor modules at a first distance, the second configuration being configured to connect the at least two sensor modules at a second distance, and the first configuration and the second configuration of the rod assembly being configured to be interchangeable with one another.

4. The kit according to claim 1, wherein the kit comprises a plurality of linkage rods, the plurality of linkage rods being configured to compose the linkage assembly and form a truss.

5. The kit according to claim 4, wherein each of the at least two sensor modules is configured to be located at a node of the truss.

6. The kit according to claim 4, wherein at least one of the at least two sensor modules is configured as a load-bearing structure of the truss.

7. The kit according to claim 1, wherein the kit comprises modules configured to compose at least one of the at least two sensor modules, the modules comprising at least two different, interchangeable tip modules.

8. The kit according to claim 1, wherein the kit comprises modules configured to compose at least one of the at least two sensor modules, the modules comprising at least one type of empennage module.

9. The kit according to claim 1, wherein the kit comprises modules configured to compose at least one of the at least two sensor modules, the modules comprising at least one type of fuselage module.

10. The kit according to claim 1, wherein the kit comprises modules configured to compose at least one of the at least two sensor modules, the modules comprising at least one type of geosensor module, a geosensor module being configured to house at least one of the geophysical sensors.

11. The kit according to claim 1, wherein the kit comprises modules configured to compose at least one of the at least two sensor modules, the modules comprising at least one of at least one type of a tip module, at least one type of a fuselage module and at least one type of an empennage module, the kit further comprising a geosensor module, the geosensor module being configured to be mounted to any one of the at least one type of tip module, at least one type of fuselage module and at least one type of empennage module.

12. An airborne unitary structure for an array of geophysical sensors, the structure being configured to be towed by an aircraft and composed of modules of a kit according to claim 1.

13. A kit for assembling an airborne sensor module, the sensor module being configured to be towed by an aircraft, the kit comprising:

at least one tip module configured to house electric or electronic components, at least one fuselage module, a plurality of fins and at least one geosensor module configured to house a geophysical sensor, wherein the at least one tip module, the at least one fuselage module, the plurality of fins and the at least one geosensor module are configured to be repeatedly assembled and disassembled; and a linkage assembly that comprises at least one collapsible rod assembly.

14. The kit according to claim 13, further comprising:

a linkage assembly that comprises a first configuration of a rod assembly and a second configuration of a rod assembly, the first configuration being configured to connect at least two sensor modules at a first distance, the second configuration being configured to connect the at least two sensor modules at a second distance, and the first configuration and the second configuration of the rod assembly being configured to be interchangeable with one another.

15. The kit according to claim 13, further comprising:
a plurality of linkage rods, the plurality of linkage rods being configured to compose the linkage assembly and form a truss.

16. The kit according to claim 15, wherein a sensor module is configured to be located at a node of the truss.

17. The kit according to claim 15, wherein a sensor module is configured as a load-bearing structure of the truss.

18. A method for assembling an airborne unitary structure for an array of geophysical sensors, the method comprising the steps of:
providing at least two sensor modules, each sensor module being configured to house at least one geophysical sensor;
providing a linkage assembly;
assembling the linkage assembly in one of at least two different configurations, the two configurations differing from one another in at least one of the number of sensor modules connected by the linkage assembly and the distances between the at least two sensor assemblies; and
connecting the at least two sensor modules with one another using the linkage assembly; wherein the linkage assembly comprises at least one collapsible rod assembly.

* * * * *